United States Patent Office 3,386,572
Patented June 4, 1968

3,386,572
UPGRADING OF COPPER CONCENTRATES FROM FLOTATION
Edward Peter Cadwell, San Antonio, Tex., assignor to American Cyanamid Company, Stamford, Conn., a corporation of Maine
No Drawing. Filed Mar. 8, 1965, Ser. No. 438,119
7 Claims. (Cl. 209—3)

ABSTRACT OF THE DISCLOSURE

An iron containing copper ore is floated to yield a rougher copper concentrate which is upgraded by separating the rougher concentrate into sand and slime fractions. The sand fraction is conditioned with cyanides at high alkalinity, to remove the copper activation or filming on coarse pyrite particles, and permits the depression of a relatively copper-free pyrite product into a flotation tailing, and recovery of an upgraded copper fraction. The slime rougher fraction is treated by conventional flotation methods. The sands and slimes may be recombined after the cyanidation of the sands to permit floating the sands and slimes in a single operation.

---

This invention relates to improvements in a process of recovery of copper from sulfide copper ores containing the sulfides of iron, particularly pyrite, and more particularly, to an economical method of recovering smelter grade copper concentrate which has an improved grade and is uniquely low in pyrite content.

Freedom from pyrite is particularly significant in the smelting of copper as one standard method of converting the sulfide ores of copper to usable metallic copper is a smelting operation which burns out the sulphur yielding metallic copper. In such an operation the sulfides of iron become a slag, which tends to deposit on the walls of the smelter reducing throughput capacity until shutdown for cleaning is required. The length of times between shutdowns for cleaning of the smelting equipment is markedly lengthened by reducing the iron content of the feed. The slag containing copper is discarded and represents a copper loss. The lower the iron sulfide concentration the better suited for smelting and the more valuable is the smelter feed. Iron as pyrite frequently occurs in conjunction with copper ores and at times a thin coating of copper in the form of a sulfide, such as covellite or chalcocite, covers at least part of the pyrite. The coating may be from a monomolecular film to a complete replacement of pyrite. In floating operations only the surface of the particles is important and, hence, if a particle predominantly pyrite is coated with a thin or partial film of covellite or chalcocite (copper sulfides), as far as the flotation operation is concerned, the particle behaves as if it were pure covellite or chalcocite.

In flotation much of the phenomena are explained in terms of contact angles and wettability of mineral particles and even if only a portion of the surface of a particle is attracted to the collector, the particle tends to attach to a bubble and float.

Tailings or tails are used to designate the portion of the feed which does not float in a flotation operation. The concentrate is that portion which does float. Usually, but not necessarily, the floated concentrate contains the values which are to be recovered. The tailings from any particular flotation operation may be discarded as being too low in useful values to be economically reworked or may be fed to a subsequent operation which recovers additional mineral values.

A scavenger float is a flotation on an ore fraction from which some mineral values have been previously removed and is usually used to designate a flotation in which a high percentage of mineral values are to be recovered but in which the grade is not particularly important because the concentrate from the scavenging operation is usually reworked somewhere in the flow sheet.

A cleaning flotation is one which is primarily designed to secure a concentrate of high grade even at the expense of a high recovery as the tailings from a cleaning operation are frequently recycled to recover any mineral values remaining.

Any of these flotations may occur in more than one stage.

It has been customary to grind copper ores to about minus 65 mesh and float in a rougher float, which may be followed by scavenging operations designed to float all sulfides, with the final tailings being discarded. The rougher concentrate is ground sufficiently fine so that preferably each individual particle is essentially of one material, and subjected to reflotation or cleaning operations. If an ore is sufficiently finely divided each particle will be essentially homogeneous. Grinding to this extent is usually not economically feasible and, accordingly, some ores are ground to about minus 400 mesh or finer for the final separation by flotation even though some pyrite still floats with the copper minerals. An economic compromise between grinding costs and grade of the final flotation concentrate is reached, as the grinding is an expensive operation.

In the absence of copper as a sulfide or oxide, cyanide ion has been known as a pyrite depressant, but where copper was present as a sulfide, or oxide, and hence in reactable form, a rapid consumption of cyanide ion occurs, so that there has been little or no effect on pyrite in practical ore processing.

The use of cyanides in floating lead sulfide, with inhibition of iron sulfide flotation is disclosed in U.S. Patent 1,421,585, Sheridan and Griswold, "Concentration of Ores by Flotation," July 4, 1922. The cyanide inhibits the flotation of the iron sulfide, and copper or silver sulfides follow the galena.

U.S. Patent 1,427,235, Sheridan and Griswold, "Concentration of Ores," Aug. 29, 1922, discloses the flotation of mixed sulfide ores, mentioning copper, zinc and lead. The ore pulp is treated with a cyanide and an alkaline salt or alkali metal hydroxide, with thorough mixing as a preliminary step to flotation. The mixture is heated, to improve effectiveness.

A. M. Gaudin, "Flotation," McGraw-Hill Book Co., New York (1932), at page 161, mentions the effect of cyanide on the floatability of pyrite, mentioning that the solvent action of cyanide on chalcocite and covellite can be considered as a possible source of decreased floatability for pyrite having thin films of copper sulfide at its surface, but concludes that "widely diverging reports concerning the desirability of using cyanide have been received from various quarters." Page 170 thereof refers to data by American Cyanamid Company staff on Cananea ore.

The actual thin films of copper minerals on pyrite have been shown in photomicrographs, E. P. Cadwell, "Color Microscopy For The Mill Man"; see Engineering Mining Journal (1959) 160; 81–93.

The rate of dissolution of a surface coating per unit of area is largely independent of the particle size. With a representative grind, the smallest 10% by weight of particles has 90% of the surface area of the total particles. Hence, with slimes present, cyanide consumption can be uneconomic, because the area open to cyanide attack is so large. If the ore is ground too fine, the cyanide consumption can increase to beyond the most economical value.

It has now been found that a superior separation can be achieved by making a rougher flotation of all sulfides from low grade ores (or using high grade ores directly, if available), which is preferably at about minus 65 mesh, and using a cyclone or hydraulic classifier to make a sand-slime separation at about minus 300 mesh to about minus 600 mesh, and treating the sands, that is the fraction between about minus 65 mesh and about minus 300 mesh to about minus 600 mesh, while on the alkaline side, with a source of soluble cyanide ions, usually in the range of from about ¼ to 20 pounds per ton of rougher concentrate, expressed as sodium cyanide equivalent, and then performing a second flotation which floats the copper values from pyrite, preferably in the presence of lime, and after a regrind. The cut-off point between slimes and sands is usually not too sharp. The degree of separation provided by a conventional cyclone gives good results, and depending on feed rate, pressure drop, etc., the split is between about minus 325 mesh and about minus 600 mesh. The cut-off point depends more on the separating equipment available than theoretical limits. It is diffifficult to get a cut-off at minus 800 mesh, but if a classifier with such a cut-off point is available, good results are obtained. Usually a cut-off of about minus 400 to minus 600 mesh is used because mechanical equipment for this cut-off range is most commonly available. If the slimes are present, cyanide consumption is unduly high, and an appreciable portion or even major portion of the copper in the slimes is dissolved as a cyanide. But, with the cyanide treatment of the sands only, the thin copper mineral coating on pyrite particles is dissolved so that the pyrites can be selectively depressed, or kept from floating while the copper-containing particles float. The amount of copper which is dissolved is a minor fraction of the total copper present and, accordingly, the losses by solution as a cyanide of copper can be kept sufficiently low that the dissolved copper cyanide can be discarded. The copper cyanide can be separately recovered after the flotation and separation of the liquid phase from the solid, but in many instances, it is economically preferable to keep the cyanide consumption so low that it may be more economically discarded rather than recovered. By separating the slimes before the treatment of the sands the total surface area available to attack by cyanide is small enough that the cyanide consumption is within economic limits and the loss of copper in the cyanide solution is not excessive.

Optionally, the cyanide itself can be recovered by acidification of the effluent from the mill, with separation of copper as a cuprosulfide, and stripping of cyanide as HCN from the aqueous acidic waste. Copper can be recovered with loss of cyanide by conventional methods such as precipitation on aluminum or iron by replacement.

As an optional matter of choice the thus cyanided sands can be floated direct or mixed with the slimes and floated. Optionally, of course, in large scale operations it is to be understood that staged treatments and multiple flotations with selections of preferred fractions are within the scope of the present invention. For instance, the sands may be subjected to an initial float after the cyanide treatment which separates a comparatively high grade copper and a second scavenger float taken in which the concentrate runs lower in copper and higher in iron and which is advantageously either reground or retreated with cyanide, or both, with the tailings from the second float either being discarded or treated for recovery of iron and sulphur values. Pyrites may be selectively floated instead of discarded wherever economically justified.

The degree of grinding prior to the rougher flotation depends on the type of ore encountered. In some ores a finer grind is required for effective separation from the first rougher concentration. Grinding should be fine enough so that at least part of the copper sulfide minerals or iron sulfide minerals are exposed in each particle containing such mineral so that that particle will attach to a bubble using conventional flotation techniques. In conventional flotations if part of the mineral is exposed that part will cause the particle to adhere to a bubble and float. Where there is no such mineral exposed, there is no point of attachment for a bubble and, hence, the particle does not float. With some ores a grind as coarse as minus 35 mesh (minus 35 mesh means the material passes through a standard screen with 35 meshes per inch) permits adequate separation. With others a grind to entirely minus 65 mesh is required. More usually a grind somewhere between these limits gives a most economical recovery, as for example all minus 35 mesh and 90% minus 65 mesh. The optimum grind varies with the grade of the ore, the characteristics of the ore, plant and smelter capacity and characteristics, and the selling price of copper. The adjustment of such variations is in accordance with usual practices.

In the present invention crude calcium cyanide is usually the soluble cyanide of choice as the crude calcium cyanide contains some lime, which is an added advantage. The selling price of crude calcium cyanide is usually based on the cost of cyanide, expressed as sodium cyanide equivalent present. Where economically available, sodium cyanide, hydrocyanic acid (HCN), other alkali or alkaline earth cyanides or organic cyanides, such as lactonitrile, have good results. With many of these, for example hydrocyanic acid, additional lime is required to neutralize and properly alkalize the float. Considering the cost of extra lime, the cheapest source of cyanide is preferred and frequently is crude calcium cyanide.

From ¼ to 20 pounds, expressed as sodium cyanide equivalent, per ton of dry rougher concentrate is usually preferred. The usage of ¼ pound per ton gives some improvement, but not an economic maximum. Over 20 pounds per ton usually results in higher reagent costs, and copper losses through solution. From about 1 to 5 pounds per ton of dry rougher concentrate is a preferred operating range with most ores.

Upgrading with cyanide can be shown in the following flow chart:

Upgrading With Cyanide

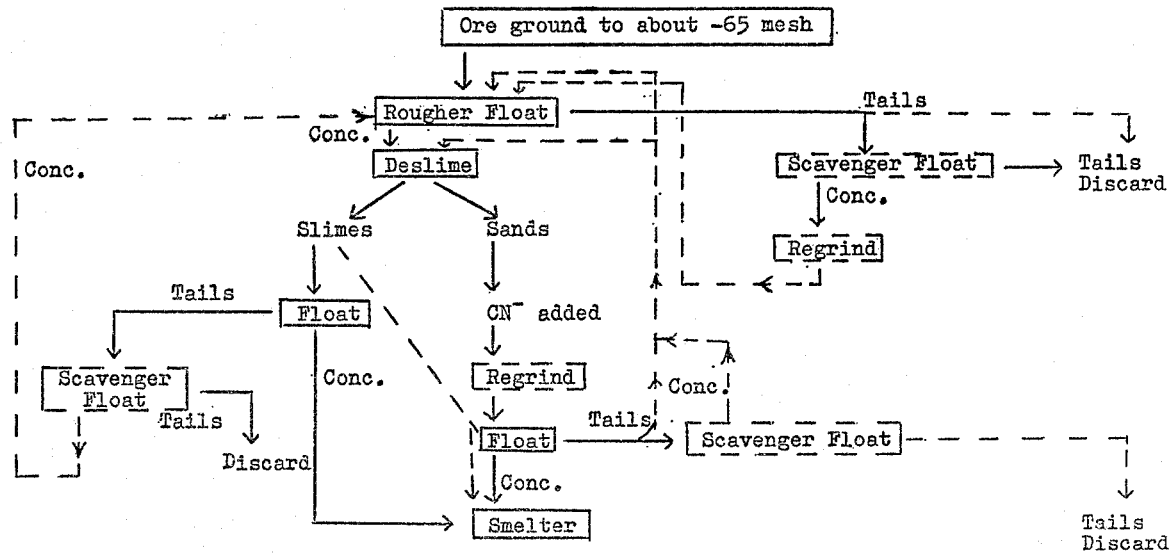

In this flow chart the optional steps are indicated in brackets or with dotted lines. In any flotation step two or more cuts may be taken although usually a float combined with a scavenger float of the tailings (tails) is most economical.

Essentially the concentrate from the first rougher float is deslimed, the sands are treated with cyanide in the presence of lime, and floated. Preferably the sands are reground after the addition of the cyanide and lime. The slimes may be added directly to this second float or the slimes may be floated separately or the slimes may be shipped directed to the smelter as final concentrate along with the sand float concentrate. The grade of the slimes can be improved by a slime flotation with the concentrate being sent to the smelter and the tails from this slime float either directly or after a scavenger float being discarded. The slime scavenger float concentrate is recycled, preferably to the rougher float. The tails from the sand flotation either directly or after a scavenger float may be discarded, or directly or after the scavenger float recycled to either the desliming step or fed back to the rougher float. Usually the rougher float tails are run through a scavenger float, the tails from this scavenger float being discarded and the concentrate usually, but not necessarily, being reground and returned to the rougher float.

Other variations within the scope of this invention suggest themselves to those skilled in the art, both by conventional modifications and illustrations in the following examples. All percentages are by weight, and weights are on a dry basis.

Example 1.—Western U.S. ore—mostly chalcopyrite

At a western U.S. copper mill, primary and scavenger rougher concentrates are produced. Only the primary rougher concentrate is cleaned. The scavenger rougher concentrate is recycled for further treatment to the start of rougher flotation, after regrinding.

The primary rougher concentrate is deslimed by a cyclone at about minus 600 mesh. The stands are treated for 10 minutes with 3 lbs. crude calcium cyanide (1.5 lb. sodium cyanide equivalent—this is a standard method of calculation in the industry, and the excess lime in the crude calcium cyanide is desirable) and 3 lbs. CaO per ton of rougher concentrate dry solids. For convenience in this and other examples the CaO is usually added as an aqueous slurry, which is halogenated, but all calculations are on the basis of CaO. Dry CaO may be fed, if a suitable dry feeder is available, and hydration occurs in the ore slurry. The treated sands are then floated to produce a finished copper concentrate and a tailing low in copper. The results of a typical run are shown below:

| Product | Percent Wt. | Percent Cu | Distribution of Cu |
|---|---|---|---|
| Rougher conc | 100.0 | 25.1 | 100.0 |
| Slimes | 26.4 | 24.9 | 26.1 |
| Sands | 73.6 | 25.2 | 73.9 |
| Sands, Cu Conc | 62.3 | 29.4 | 73.0 |
| Sands, Cu Tail | 11.3 | 1.5 | 0.9 |
| Sands Cu Conc. + Slimes | 88.7 | 28.1 | 99.1 |

The predominant copper mineral in this ore is chalcopyrite which contains 34.5% copper. The rougher concenrate, which assayed 25.1% copper, calculates out to 72.8% chalcopyrite and 27.2% impurities, such as pyrite, gangue minerals, etc. Some copper is present as other minerals, but for convenience in calculation, chalcopyrate is used as a base.

The sands concentrate assayed 29.4% copper, the equivalent of 85.2% chalcopyrite, and 14.8% impurities. The treatment, thereofore, reduced the content of the impurities from 27.2% to 14.8% or by 46%.

A separate flotation of slimes is not required.

By combining the sands concentrate and slimes, a product was obtained equal to 81.4% chalcopyrite and 18.6% impurities. In upgrading the concentrate, impurities were reduced from 27.2% to 18.6%.

Example 2.—Western U.S. ore

This run is on the ore from the same mill as in Example 1. The cyclone sands are treated with cyanide and given a short grind before flotation. The same cyanide and lime ratios as in Example 1 are used. The screen analysis of the sands before and after grinding are shown below:

SCREEN ANALYSIS—SANDS

| Mesh | Percent Weight | |
|---|---|---|
| | Before Grind | After Gridn |
| +200 | 65.8 | 37.7 |
| +325 | 13.9 | 27.4 |
| −325 | 20.3 | 34.9 |

The ground sands, after cyanide treatment, are floated in the same manner as in Example 1.

| Product | Percent Wt. | Percent Cu | Distribution, Percent Cu |
| --- | --- | --- | --- |
| Rougher Conc. | 100.0 | 24.8 | 100.0 |
| Slimes | 26.2 | 24.6 | 25.9 |
| Sands | 73.8 | 24.9 | 74.1 |
| Sands, Cu Conc. | 55.4 | 33.0 | 73.8 |
| Sands, Cu Tail | 18.4 | .41 | .3 |
| Sands, Cu Conc. plus Slimes | 81.6 | 30.3 | 99.7 |

The sands concentrate which assayed 33.0% copper contained 95.7% chalcopyrite and only 4.3% impurities.

This concentrate can be smelted by itself, or combined with the slimes to produce a product which assays 30.3% and contains 12.1% impurities.

Alternatively, the slimes can be upgraded by conventional methods. These alternatives permit adaptation of the process for the most economical recovery at a particular mill site, and depending on size, raw materials, etc., different modifications may be used at different places.

Example 3.—South American ore—effect of grinding

A rougher concentrate produced at a South American mill was separated by cycloning into sands and slimes with a split at approximately minus 600 mesh.

The sands were treated with 5 lbs. crude calcium cyanide (2.5 lbs. NaCN equivalent) and 3 lbs. CaO per ton of rougher concentrate. In one part the treated sands were floated directly; in the other part the treated sands were reground afer addition of the cyanide and lime but before flotation. The degree of the grinding is shown below:

SCREEN ANALYSIS—SANDS

| Mesh | Percent Weight | |
| --- | --- | --- |
| | Before Grind | After Grind |
| +200 | 57.6 | 19.2 |
| +325 | 12.6 | 27.6 |
| −325 | 29.8 | 53.2 |

In both tests flotation was identical and produced a finished copper concentrate and an intermediate product (scavenger float) for further treatment, and a discardable tailing.

The results are shown below:

| Product | Percent Wt. | Assays, Percent | | Distribution in Sands, Percent | |
| --- | --- | --- | --- | --- | --- |
| | | Cu | Fe | Cu | Fe |
| NO GRIND | | | | | |
| Sands | 100.0 | 32.3 | 14.2 | 100.0 | 100.0 |
| Cu Conc. | 64.0 | 48.2 | 10.1 | 95.4 | 45.6 |
| Scavenger Conc. | 9.5 | 11.7 | 13.8 | 3.4 | 9.2 |
| Tail | 26.5 | 1.4 | 24.2 | 1.2 | 45.2 |
| WITH REGRIND | | | | | |
| Sands | 100.0 | 30.7 | 14.6 | 100.0 | 100.0 |
| Cu Conc. | 55.0 | 54.1 | 10.8 | 97.1 | 40.7 |
| Scavenger Conc. | 5.6 | 9.4 | 30.3 | 1.6 | 11.4 |
| Tail | 39.4 | 1.0 | 17.8 | 1.3 | 47.9 |

Of the total copper minerals present, 21.6% were chalcopyrite, 53.8% were chalcocite; 23.1% were covellite; and 1.5% were bornite. With this distribution, a concentrate consisting of pure copper minerals would assay 66.9% copper.

In the test without regrind, the concentrate assayed 48.2% copper. This is equivalent to 71.9% copper minerals and impurities of 28.1%.

When regrind was employed, the concentrate assayed 54.1% copper and contained 80.7% copper mineral. The impurities were reduced from 28.1% to 19.3%.

In addition, copper recovery was increased from 95.4% to 97.1% by the use of a regrind.

Example 4.—South American ore

In this experiment the same rougher concentrate as in Example 3 was deslimed by cyclone at minus 600 mesh. The sands were treated with 5 lbs. crude calcium cyanide (2.5 lbs. NaCN equivalent) and 3 lbs. CaO per ton of rougher concentrate and a high grade concentrate separated by flotation as the first copper concentrate. The tailing from this operation was reground with 2.5 lbs. additional crude calcium cyanide (1.25 lbs. NaCN equivalent) and 2 lbs. CaO per ton of rougher concentrate and refloated to produce a copper concentrate, a scavenger concentrate and a discardable tail. The scavenger concentrate is fed back and added to the initial rougher concentrate.

| Product | Percent Wt. | Assays, Percent | | Distribution in Sands, Percent | |
| --- | --- | --- | --- | --- | --- |
| | | Cu | Fe | Cu | Fe |
| Sands | 100.0 | 27.4 | 15.3 | 100.0 | 100.0 |
| 1st Cu Conc. | 13.7 | 63.9 | 5.4 | 32.1 | 4.9 |
| 2nd Cu Conc. | 31.9 | 52.9 | 9.8 | 61.8 | 20.6 |
| Scavenger Conc. | 6.4 | 15.8 | 25.2 | 3.7 | 10.5 |
| Tail | 48.0 | 1.4 | 20.4 | 2.4 | 64.0 |
| Total Conc. | 45.6 | 56.2 | 8.5 | 93.9 | 25.5 |

Example 5.—Western U.S. ore

A rougher concentrate was deslimed with a cyclone at about minus 600 mesh. The sands were reground with 4 lbs. sodium cyanide (NaCN) and 6 lbs. CaO per ton of rougher concentrate. The reground sands were combined with the slimes and floated.

| Product | Percent Wt. | Percent Cu | Distribution, Percent Cu |
| --- | --- | --- | --- |
| Rougher Conc. | 100.0 | 12.6 | 100.0 |
| Cu Conc. | 16.2 | 45.7 | 59.0 |
| Scavenger Conc. | 38.9 | 12.7 | 39.3 |
| Tail | 44.9 | 0.5 | 1.7 |

The scavenger concentrate was returned to the feed.

Example 6.—Western U.S. ore—usual procedure

At present, at this mill a primary and a scavenger rougher concentrate are produced. The primary concentrate is reground and cleaned to produce a finished concentrate and a cleaner tail. The cleaner tail, along with the scavenger concentrate, is recycled to the head of the rougher flotation.

During an experimental mill run the above flow sheet produced the following results:

Conc.—27% copper.
Tails—0.22% copper.
Copper recovery—73.6%.

Cyanide flotation procedure

The primary concentrate from the above was deslimed at 400 mesh in a cyclone.

The sands were reground with 4 lbs. crude calcium cyanide (2.0 lbs. NaCN equivalent) and 4 lbs. CaO per ton of sands and cleaned to produce a final concentrate and sand cleaner tail.

The slimes were floated to produce a finished concentrate and slime cleaner tail.

Both the sand and slime cleaner tails, along with the reground scavenger concentrate were recycled to the head of rougher flotation.

An analysis of the concentrate showed:

Conc.—31.6% copper.
Tails—0.19% copper.
Copper Recovery—76.4%.

Example 7.—South American ore—experimental mill test

In this test, one section of the mill was isolated and cyanide treatment used to upgrade the concentrates. The rest of the mill remained on the standard flowsheet. The ground ore was floated to produce a rougher concentrate and rougher tail.

Standard procedure

The rougher concentrate was reground and refloated to produce a finished concentrate and a cleaner, or scavenger, tail which was discarded along with the rougher tail to make up the plant or combined tail.

Cyanide treatment

The rougher concentrate was deslimed in a cyclone at about 400 mesh. The slimes were floated directly and separately to produce a finished slime concentrate and a slime scavenger tail. The slime scavenger tail plus rougher tail make up the plant or combined tail. The scavenger concentrate is recycled to the rougher float.

The sands were reground with 5 lbs. crude calcium cyanide (2.5 lbs. NaCN equivalent) and 5 lbs. CaO per ton of rougher concentrate, then floated to produce a finished concentrate and a sand cleaner tail. The sand clearner tail is recycled to the rougher concentrate cyclone. Any fine material produced in regrind enters the slimes and the remainder follows the sands for further cyanide treatment and regrinding.

The only tailing leaving the cyanide treatment section is the slimes cleaner tail produced in the slimes cleaning section. The slimes cleaner tail joins the rougher tail to make up the combined tail.

| Product | Cyanide Treatment, Percent | | | Standard Treatment, Percent | | |
|---|---|---|---|---|---|---|
| | Cu | Fe | Rec. | Cu | Fe | Rec. |
| Ore Feed | 1.42 | 1.7 | 100.0 | 1.27 | 1.5 | 100.0 |
| Final Conc | 46.4 | 14.2 | 90.8 | 42.5 | 17.9 | 86.9 |
| Scavenger Tail | 0.69 | | | 0.72 | | |
| Combined Tail | 0.18 | | 9.2 | 0.21 | | 13.1 |
| Sands | 13.5 | 23.7 | | | | |
| Sands Conc | 52.5 | 9.9 | | | | |
| Slimes | 12.8 | 13.3 | | | | |
| Slime Conc | 43.6 | 15.7 | | | | |

Even with a higher copper feed, a lower tailing copper content was obtained with the cyanide treatment. The variations in feed was accidental.

For a full mill run of 52,000 tons of ore per day this calculates out to:

Cyanide treatment 1.42% Cu=738.4 tons Cu—input
@ 90.8% rec.=670.5 tons Cu recovered
Tons con. @ 46.4% Cu=1445
1445 tons @ 14.2% Fe=205.2 tons Fe to smelter, which produces a slag

Standard treatment 1.27% Cu=660.4 tons Cu—input
@ 86.9% rec.=573.9 tons Cu
Tons conc. @ 42.5% Cu=1350 tons
1350 tons @ 17.9% Fe=241.7 tons Fe to smelter Reclaculating the standard at a higher copper content:

1.42% Cu=738.4 tons Cu—input
@ 86.9% rec.=641.7 tons Cu—recovered
Tons Conc. @ 42.5% Cu=1510 tons
1510 tons @ 17.9% Fe=270.3 tons Fe to smelter This has a monetary value of about $14,000.00 a day in copper, plus the smelter savings.

Example 8.—Effect of lime

A primary rougher concentrate was deslimed at 600 mesh in a cyclone. The sands were conditioned with lime and cyanide and then floated.

The flotation procedure was to float a total of 14 minutes. The concentrate from the first 7 minutes was a finished concentrate. The material which floated in the second 7 minutes was designated as scavenger concentrate.

In the test in which no CaO was added, the concentrate was the material which floated in the entire 14 minutes:

| Rougher Conc. | | | | | Assay | | Percent Distribution | |
|---|---|---|---|---|---|---|---|---|
| CaO, lb./ton | Crude Calcium Cyanide, lb./ton | pH | Product | Percent Wt. | Cu | Fe | Cu | Fe |
| None | 10.0 | 12.2 | Sands | 100.0 | 10.4 | 31.2 | 100.0 | 100.0 |
| | | | Conc | 9.0 | 46.2 | 16.0 | 40.0 | 4.5 |
| | | | Scavenger | | | | | |
| | | | Tail | 91.0 | 6.8 | 32.7 | 60.0 | 95.5 |
| 2.5 | 10.0 | 12.5 | Sands | 100.0 | 10.5 | 31.6 | 100.0 | 100.0 |
| | | | Conc | 16.4 | 41.9 | 18.5 | 65.5 | 9.6 |
| | | | Scavenger | 34.4 | 9.5 | 32.0 | 31.2 | 34.8 |
| | | | Tail | 49.2 | 0.71 | 35.6 | 3.3 | 55.6 |
| 5.0 | 10.0 | 12.6 | Sands | 100.0 | 10.5 | 30.9 | 100.0 | 100.0 |
| | | | Conc | 19.1 | 40.9 | 18.0 | 74.5 | 11.1 |
| | | | Scavenger | 31.1 | 7.4 | 33.2 | 22.0 | 33.4 |
| | | | Tail | 49.8 | 0.74 | 34.4 | 3.5 | 55.5 |
| 10.0 | 10.0 | 12.7 | Sands | 100.0 | 10.2 | 30.4 | 100.0 | 100.0 |
| | | | Conc | 15.9 | 42.9 | 16.6 | 66.7 | 8.6 |
| | | | Scavenger | 32.8 | 9.2 | 29.0 | 29.8 | 31.3 |
| | | | Tail | 51.3 | 0.71 | 35.6 | 3.5 | 60.1 |

The added lime has an important bearing on copper recovery as shown in the table.

Example 9.—Western ore—experimental mill test

For comparison, one section of the mill was isolated and cyanide treatment used to upgrade the concentrates. Another section of the mill remained on the standard flowsheet. The ground ore was floated to produce a rougher concentrate and rougher tail.

Standard procedure

The rougher concentrate was reground and refloated to produce a finished concentrate and a cleaner, or scavenger, tail which was recycled to the head of rougher flotation.

Cyanide treatment

The rougher concentrate was deslimed in a cyclone at about 400 mesh. The slimes were floated directly and separately to produce a finished slime concentrate and a slime scavenger tail. The slime scavenger tail was recycled to the head of rougher flotation.

The sands were reground with 1.0 lb. crude calcium cyanide (0.5 lb. NaCN equivalent and 1.0 lb. CaO per ton of rougher concentrate, then floated to produce a finished concentrate and a sand cleaner tail. The sand cleaner tail was recycled to the head of rougher flotation.

CYANIDE TREATMENT

| Product | Percent Cu | Percent Fe | Percent Isol. | Percent Rec. |
| --- | --- | --- | --- | --- |
| Ore Freed | 0.869 | 3.00 | ---------- | 100.0 |
| Final Conc | 31.32 | 24.19 | 11.32 | 88.9 |
| Final Tail | 0.099 | 2.52 | ---------- | 1.1 |

STANDARD TREATMENT

| Product | Percent Cu | Percent Fe | Percent Isol. | Percent Rec. |
| --- | --- | --- | --- | --- |
| Ore Freed | 0.869 | 3.00 | ---------- | 100.0 |
| Final Conc | 29.06 | 23.43 | 15.37 | 88.9 |
| Final Tail | 0.099 | 2.49 | ---------- | 1.1 |

The concentrate grade was increased while recovery was equal to normal practice. This increase in concentrate grade reduces smelter feed by 8%, without lowering copper recovery.

I claim:

1. A method of recovering a high grade copper sulfide concentrate from an ore containing sulfides of copper and sulfides of iron comprising: grinding to a froth floatable size which exposes at least part of the sulfide minerals at the surface of the particles, substantially all sulfide mineral values being smaller than about 65 mesh, adding a collector for sulfide copper, froth floating to obtain a first rougher concentrate containing a major fraction of the copper minerals, and discarding at least that portion of the tails which are essentially free from copper minerals; separating the sands and slimes in said first rougher concentrate at a size dividing line of between about 300 mesh and about 800 mesh, treating the separated sands with a soluble cyanide in the amount of from about ¼ to about 20 pounds of sodium cyanide equivalent per ton of rougher concentrate in the presence of from 1 to 20 pounds of lime per ton of rougher concentrate, and then again froth floating the sands to provide a rich copper concentrate.

2. The method of claim 1 in which the slimes are again floated to provide a copper concentrate.

3. A method of recovering a high grade copper sulfide concentrate from an ore containing sulfides of copper and sulfides of iron comprising: grinding to about minus 65 mesh, transferring the ground ore to a first froth flotation operation, adding a collector for sulfide copper, separating by froth flotation a first rougher concentrate containing a major fraction of the copper minerals from the rougher tails, separating a second scavenger concentrate containing most of the residual copper minerals and a discardable essentially copper free tail, regrinding and recycling the said scavenger concentrate ahead of the first flotation operation, separating the sands and the slimes in said first rougher concentrate at a size dividing line of between about 300 mesh and about 800 mesh, treating the sands with a soluble cyanide in an amount equal to from about 1 to about 10 pounds of sodium cyanide equivalent and from 1 to 20 pounds of lime per ton of rougher concentrate, lightly grinding the thus treated sands and then floating the sands to provide a rich copper concentrate.

4. The process of claim 3 in which the slimes are separately floated to provide a copper concentrate.

5. A method of recovering a high grade smeltable copper sulfide concentrate from an ore containing sulfides of copper and sulfides of iron comprising: grinding to about minus 65 mesh, adding a collector for sulfide copper, separating a rougher copper concentrate by froth flotation, separating said rougher concentrate to about minus 600 mesh into sands and slimes, adding crude calcium cyanide in an amount equal to from about 1 to 10 pounds of sodium cyanide equivalent and from about 1 to 20 pounds of lime per ton of rougher concentrate to the sands fraction, lightly grinding the thus cyanided sands, and froth floating the sands to provide a rich copper concentrate.

6. A method of recovering a high grade smeltable copper sulfide concentrate from an ore containing sulfides of copper and sulfides of iron comprising grinding to about minus 65 mesh, transferring the ground ore to a first froth flotation operation, adding a collector for sulfide copper, separating by froth flotation a first rougher concentrate, separating said concentrate at about minus 600 mesh into sands and slimes, regrinding the sands with a soluble cyanide in an amount equal to from about 1 to 10 pounds of sodium cyanide equivalent and about 1 to 20 pounds of lime per ton of concentrate, combining the thus treated sands and slimes, transferring to a second froth flotation operation and froth floating a high grade smeltable copper sulfide concentrate.

7. A method of recovering a high grade smeltable copper sulfide concentrate from an ore containing sulfides of copper and sulfides of iron comprising: grinding to about minus 65 mesh, transferring the ground ore to a first rougher froth flotation operation, adding a collector for sulfide copper, froth floating the ground ore, passing the tails from said first flotation operation through a scavenger froth float, regrinding the scavenger concentrate and recycling to said rougher froth float, discarding the scavenger float tails, separating the rougher concentrate in a cyclone at about minus 400 mesh into sands and slimes, separately froth floating the thus separated slimes to produce a finished slime concentrate, scavenger floating the tails from said slime flotation, and recycling the slime scavenger concentrate to the rougher float; regrinding the rougher concentrate sands with crude calcium cyanide equivalent to 1 to 10 pounds of sodium cyanide and 1 to 20 pounds of lime per ton of rougher concentrate, lightly grinding the thus treated sands, floating the reground sands to produce a finished concentrate and a sand cleaner tail and recycling the sand cleaner tail to the rougher concentrate cyclone.

References Cited

UNITED STATES PATENTS

| | | | |
| --- | --- | --- | --- |
| 1,552,936 | 9/1925 | McArthur | 209—167 |
| 2,195,724 | 4/1945 | Gaudin | 209—167 |
| 2,483,970 | 10/1949 | Gieseke | 209—166 |
| 2,984,354 | 5/1961 | Booth | 209—167 |
| 3,220,551 | 1/1965 | Moyer | 209—167 |

FOREIGN PATENTS 401,720  11/1933  Great Britain.

OTHER REFERENCES

Taggart, Handbook of Mineral Dressing, 1945, John Wiley & Sons, 2–57, 2–58, 2–64, 2–65; TN 500 T3.

HARRY B. THORNTON, *Primary Examiner.*

ROBERT HALPER, *Assistant Examiner.*